US008687586B2

(12) United States Patent
Wirtanen et al.

(10) Patent No.: US 8,687,586 B2
(45) Date of Patent: Apr. 1, 2014

(54) SYSTEM AND METHOD FOR MANAGING IP SESSIONS BASED ON HOW MANY IP SESSIONS ARE SUPPORTED

(75) Inventors: Jeff Wirtanen, Kanata (CA); M. Khaledul Islam, Kanata (CA); Trevor Plestid, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 1499 days.

(21) Appl. No.: 11/549,404

(22) Filed: Oct. 13, 2006

(65) Prior Publication Data

US 2008/0089304 A1    Apr. 17, 2008

(51) Int. Cl.
*H04W 4/00*    (2009.01)
*H04W 36/00*    (2009.01)
*H04W 72/00*    (2009.01)

(52) U.S. Cl.
USPC ............................ 370/331; 455/436; 455/450

(58) Field of Classification Search
USPC ........ 370/328–350; 455/452.2, 512, 450, 436
See application file for complete search history.

(56) References Cited

U.S. PATENT DOCUMENTS

| | | | |
|---|---|---|---|
| 5,420,985 A | 5/1995 | Cantrell et al. |
| 5,946,634 A | 8/1999 | Korpela |
| 6,430,619 B1 | 8/2002 | Sitaraman et al. |
| 6,466,571 B1 | 10/2002 | Dynarski |
| 6,477,373 B1 | 11/2002 | Rappaport et al. |
| 6,571,095 B1 | 5/2003 | Kookli |
| 6,738,361 B1 | 5/2004 | Immonen |
| 6,847,610 B1 | 1/2005 | Suumaki et al. |
| 6,970,445 B2 | 11/2005 | O'Neill et al. |
| 6,981,047 B2 | 12/2005 | Hanson et al. |
| 7,002,963 B1 | 2/2006 | Buyukkoc et al. |
| 7,050,445 B1 | 5/2006 | Zellner et al. |
| 7,061,887 B2 | 6/2006 | Fan |
| 7,082,130 B2 | 7/2006 | Borella et al. |
| 7,099,681 B2 | 8/2006 | O'Neill |
| 7,324,543 B2 | 1/2008 | Wassew et al. |
| 7,328,020 B2 | 2/2008 | Masuda |

(Continued)

FOREIGN PATENT DOCUMENTS

| | | |
|---|---|---|
| EP | 1 148 753 | 10/2001 |
| EP | 1 176 766 | 1/2002 |

(Continued)

OTHER PUBLICATIONS

UMTS Networks: Architecture, Mobility and Services, 2nd Edition Heikki Kaaranen, Ari Ahtiainen, Lauri Laitinen, Siam"k Naghian, Valtteri Niemi ISBN: 978-0-470-01103-4 Apr. 2005, pp. 359-360.*

(Continued)

*Primary Examiner* — Ariel Balaoing
*Assistant Examiner* — Larry Sternbane

(57) ABSTRACT

Systems and Method are provided for managing IP sessions based on how many IP sessions are supported. According to an embodiment of the application, the wireless network determines how many IP sessions can be supported for the mobile device residing in a given area such as a routing area, and to transmit to the mobile device an identification of how many IP sessions can be supported. According to another embodiment of the application, the mobile device receives the identification of how many IP sessions can be established, and manages IP sessions based on the identification. Since the mobile device is privy to how many IP sessions can be established, the mobile device is able to properly manage IP sessions.

23 Claims, 8 Drawing Sheets

(56) References Cited

U.S. PATENT DOCUMENTS

| | | | |
|---|---|---|---|
| 7,406,057 B2* | 7/2008 | Isomaki et al. | 370/328 |
| 7,581,009 B1* | 8/2009 | Hsu et al. | 709/226 |
| 7,590,122 B2 | 9/2009 | Constantinof | |
| 2001/0026538 A1* | 10/2001 | Bruss | 370/329 |
| 2002/0126633 A1 | 9/2002 | Mizutani et al. | |
| 2002/0133600 A1 | 9/2002 | Williams et al. | |
| 2002/0174220 A1 | 11/2002 | Johnson | |
| 2003/0117983 A1* | 6/2003 | Ton et al. | 370/338 |
| 2003/0142650 A1 | 7/2003 | Fan | |
| 2004/0127237 A1 | 7/2004 | Hurtta | |
| 2004/0185867 A1 | 9/2004 | Wassew et al. | |
| 2005/0043032 A1 | 2/2005 | Choi | |
| 2005/0053068 A1* | 3/2005 | Toth et al. | 370/390 |
| 2005/0070290 A1* | 3/2005 | Baggstrom et al. | 455/445 |
| 2005/0122946 A1* | 6/2005 | Won | 370/338 |
| 2005/0148359 A1 | 7/2005 | Joeressen | |
| 2005/0207340 A1 | 9/2005 | O'Neill | |
| 2006/0073826 A1 | 4/2006 | Miernik | |
| 2006/0153118 A1* | 7/2006 | Bailey | 370/328 |
| 2006/0173860 A1 | 8/2006 | Ikebe | |
| 2006/0233128 A1* | 10/2006 | Sood et al. | 370/328 |
| 2007/0030826 A1 | 2/2007 | Zhang et al. | |
| 2007/0082699 A1 | 4/2007 | Karaoguz et al. | |

FOREIGN PATENT DOCUMENTS

| | | | |
|---|---|---|---|
| EP | 1 176 766 A1 | | 1/2002 |
| EP | 1 478 157 | | 11/2004 |
| EP | 1 492 364 A | | 12/2004 |
| EP | 1 655 975 A1 | | 5/2006 |
| EP | 1 686 752 | | 8/2006 |
| EP | 1 653 655 | | 11/2006 |
| EP | 1 763 266 | | 3/2007 |
| GB | 2 373 676 A | | 9/2002 |
| JP | 2001-309432 | | 11/2001 |
| JP | 2002-536890 | | 10/2002 |
| JP | 2004/187094 | | 7/2004 |
| JP | 2004 246833 | | 9/2004 |
| JP | 2004-363730 | | 12/2004 |
| JP | 2006-129490 | | 5/2006 |
| JP | 2006-195749 | | 5/2006 |
| KR | 516917 | | 9/2005 |
| KR | 10-2006-0058558 | * | 5/2006 |
| WO | 00/45613 | | 8/2000 |
| WO | 0152583 | | 7/2001 |
| WO | WO 01/52583 | | 7/2001 |
| WO | WO 0152583 A1 | | 7/2001 |
| WO | 02067605 | | 8/2002 |
| WO | 2002067605 | | 8/2002 |
| WO | WO 03/017522 | | 2/2003 |
| WO | 03063441 | | 7/2003 |
| WO | 03084171 | | 10/2003 |
| WO | 2004/059994 | | 7/2004 |
| WO | WO 2005/084061 | | 9/2005 |
| WO | 2005109988 | | 11/2005 |
| WO | 2006/109159 | | 10/2006 |

OTHER PUBLICATIONS

UMTS Networks: Architecture, Mobility and Services, 2/e, Heikki Kaaranen, Ari Ahtiainen, Lauri Laitinen, Siamäk Naghian, Valtteri Niemi, ISBN: 978-0-470-01103-4, Wiley & Sons, LTD, pp. 169-170, Apr. 2005.*

Soursos, S., Courcoubetis, C., and Polyzos, G. 2001. Pricing differentiated services in the GPRS environment. In Proceedings of the First Workshop on Wireless Mobile internet (Rome, Italy). G. Bianchi, P. Kermani, and S. Pupolin, Eds. WMI '01. ACM, New York, NY, 62-68. DOI= http://doi.acm.org/10.1145/381472.381582.*

Vitalis G. Ozianyi, Neco Ventura, "A Novel Pricing Approach for QoS Enabled 3G Networks," Icn, pp. 578-586, The IEEE Conference on Local Computer Networks 30th Anniversary (LCN'05)I, 2005.*

3GPP TSG Core Network and Terminals: "Mobile radio interface Layer 3 specification; Core network protocols; Stage 3" 3GPP TS 24.008 V7.4.0 [Online] Jun. 2006 pp. 1, 35-161, 206-229, 284-318, 421-477, 502-521 XP002408953 Retrieved from the Internet: URL: http://www.3gpp.org/ftp/Specs/archive/24_series/24.008/24008-740.zip [retrieved on Nov. 24, 2006].

3G TS 23.060 v3.4.0 (Jul. 1, 2000), $3^{rd}$ Generation Partnership Project; Technical Specification Group Services and System Aspects; General Packet Radio Service (GPRS); Service Description; Stage 2 (Release 1999).

Koodli, R.; Puuskari, M., "Supporting packet-data QoS in next-generation cellular networks," IEEE Communications Magazine, vol. 39, No. 2, pp. 180-188, Feb. 2001 URL: http://ieeexplore.ieee.org/stamp/stamp.jsp?anumber=900650&isnumber=19494.

Office Action dated Nov. 28, 2008 for U.S. Appl. No. 11/549,394.

Office Action dated Feb. 6, 2009 for U.S. Appl. No. 11/549,390.

Office Action dated Aug. 7, 2009 from related U.S. Appl. No. 11/549,390, 23 pages.

"Combining evidence for automatic Web session identification", Daqing He et al., Information Processing and Management (2002).

English translation of a Korean Office Action dated Dec. 10, 2012 from corresponding Korean Patent Application No. 10-2009-7009628.

Office Action dated Feb. 13, 2012 from corresponding Canadian Patent Application No. 2,666,318.

Office Action dated May 11, 2012 from related U.S. Appl. No. 11/549,390.

English-language translation of an Office Action mailed on Jun. 4, 2012 from corresponding Japanese Application No. 2009-531702.

English-language translation of an Office Action mailed on Jun. 7, 2012 from related Japanese Application No. 2009-531701.

English-language translation of an Office Action mailed on Jun. 7, 2012 from related Japanese Application No. 2010-216157.

English-language translation of JP 2004-363730 obtained Jul. 4, 2012 from http://www.ipdl.inpit.go.jp/homepg_e.ipdl.

Office Action dated Aug. 17, 2011 from related U.S. Appl. No. 11/627,187.

English translation of Office Action dated Mar. 25, 2010 from related Japanese Patent Application No. 2007-217667.

Notice of References Cited that issued on Mar. 26, 2010 from related U.S. Appl. No. 11/627,187.

English-language translation of an Office Action dated Jul. 27, 2011 from related Japanese Patent Application No. 2009-531701.

Jianfeng Chen et al, A Service Flow Management Strategy for IEEE 802.16 Broadband Wireless Access Systems in TDD Mode, IEEE, 2005.

English-language translation of an Office Action dated Jul. 27, 2011 from corresponding Japanese Patent Application No. 2009-531702.

English-language translation of an Office Action dated Aug. 4, 2011 from corresponding Korean Patent Application No. 10-2011-7015483.

English-language translation of abstract of JP 2001-309432.

Extended European Search Report dated Oct. 30, 2012 from corresponding European Patent Application No. 07872821.90.

Examiner's Report issued on Oct. 5, 2011 for corresponding Canadian Patent Application No. 2,618,912, 4 pages.

English-language translation of an Office Action from related Korean Patent Application No. 10-2009-7009627.

IEEE, Qiong Zhang et al., 2003, Early Drop Scheme for Providing Absolute QoS Differentiation in Optical Burst-Switched Networks.

English-language translation of an Office Action from corresponding Korean Patent Application No. 10-2009-7009628.

English-language translation of Korean Patent No. 516917, Sep. 26, 2005.

Office Action dated Aug. 26, 2011 from related Australian Patent Application No. 2007312905.

* cited by examiner

| IEI | Information Element | Type | Presence | Format | Length |
|---|---|---|---|---|---|
| | Protocol discriminator | Protocol discriminator | M | V | 1/2 |
| | Skip indicator | Skip indicator | M | V | 1/2 |
| | Attach accept message identity | Message type | M | V | 1 |
| | Attach result | Attach result | M | V | 1/2 |
| | Force to standby | Force to standby | M | V | 1/2 |
| | Periodic RA update timer | GPRS Timer | M | V | 1 |
| | Radio priority for SMS | Radio priority | M | V | 1/2 |
| | Radio priority for TOM8 | Radio priority 2 | M | V | 1/2 |
| | Routing area identification | Routing area identification | M | V | 6 |
| 19 | P-TMSI signature | P-TMSI signature | O | V | 4 |
| 17 | Negotiated READY timer value | GPRS Timer | O | TV | 2 |
| 18 | Allocated P-TMSI | Mobile identity | O | TLV | 7 |
| 23 | MS identity | Mobile identity | O | TLV | 7-10 |
| 25 | GMM cause | GMM cause | O | TV | 2 |
| 2A | T3302 value | GPRS Timer 2 | O | TLV | 3 |
| 8C | Cell Notification | Cell Notification | O | T | 1 |
| 4A | Equivalent PLMNs | PLMN List | O | TLV | 5-47 |
| B- | Network feature Support | Network feature support | O | TV | 1 |
| 34 | Emergency Number List | Emergency Number List | O | TLV | 5-50 |
| A- | Requested MS Information | Requested MS Information | O | TV | 1 |
| 37 | T3319 value | GPRS Timer 2 | O | TLV | 3 |
| | PDP Contexts Supported value | PDP Contexts Supported | O | TV | 1 |

FIG. 4A

| IEI | Information Element | Type | Presence | Format | Length |
|---|---|---|---|---|---|
| | Protocol discriminator | Protocol discriminator | M | V | 1/2 |
| | Skip indicator | Skip indicator | M | V | 1/2 |
| | Routing area update accept message identity | Message type | M | V | 1 |
| | Force to standby | Force to standby | M | V | 1/2 |
| | Update result | Update result | M | V | 1/2 |
| | Periodic RA update timer | GPRS Timer | M | V | 1 |
| | Routing area identification | Routing area identification | M | V | 6 |
| 19 | P-TMSI signature | P-TMSI signature | O | TV | 4 |
| 18 | Allocated P-TMSI | Mobile identity | O | TLV | 7 |
| 23 | MS identity | Mobile identity | O | TLV | 7-10 |
| 26 | List of Receive N-PDU Numbers | Receive N-PDU Number list | O | TLV | 4-19 |
| 17 | Negotiated READY timer value | GPRS Timer | O | TV | 2 |
| 25 | GMM cause | GMM cause | O | TV | 2 |
| 2A | T3302 value | GPRS Timer 2 | O | TLV | 3 |
| 8C | Cell Notification | Cell Notification | O | T | 1 |
| 4A | Equivalent PLMNs | PLMN List | O | TLV | 5-47 |
| 32 | PDP context status | PDP context status | O | TLV | 4 |
| B- | Network feature support | Network feature support | O | TV | 1 |
| 34 | Emergency Number List | Emergency Number List | O | TLV | 5-50 |
| 35 | MBMS context status | MBMS context status | O | TLV | 2-18 |
| A- | Requested MS Information | Requested MS Information | O | TV | 1 |
| 37 | T3319 value | GPRS Timer 2 | O | TLV | 2 |
| | PDP Contexts Supported value | PDP Contexts Supported | O | TV | 1 |

FIG. 4B

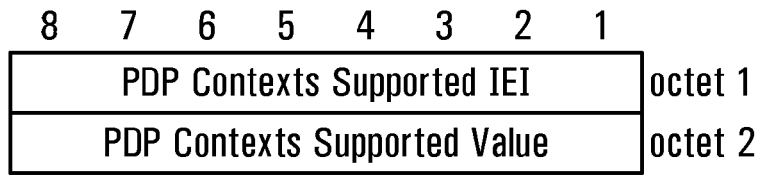
FIG. 5A
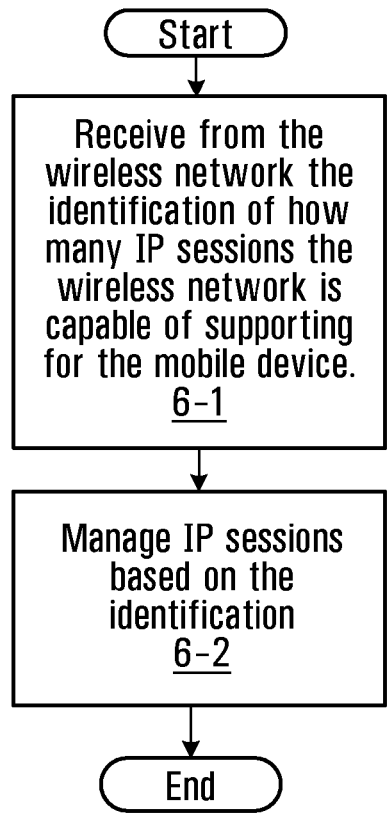
FIG. 5B
FIG. 6

SYSTEM AND METHOD FOR MANAGING IP SESSIONS BASED ON HOW MANY IP SESSIONS ARE SUPPORTED

FIELD OF THE APPLICATION

The application relates to wireless communication, and more particularly to IP sessions.

BACKGROUND

Communications between a mobile device and a corresponding node are processed in a UMTS (Universal Mobile Telecommunications System) network through GPRS (General Packet Radio Service) serving nodes. The GPRS serving nodes include an SGSN (Serving GPRS Support Node) and a GGSN (Gateway GPRS Support Node). Such communication exchange between the mobile device and the corresponding node involve communication exchange between the mobile device and the SGSN. Communication exchanges such as user plane communication (i.e. IP data traffic) between the mobile device and the SGSN node use one or more PDP contexts. There may be many PDP contexts depending on how many different applications of the mobile device are communicating over PDP contexts. However, the number of PDP contexts for the mobile device may be limited by the number of PDP contexts supported in the routing area in which the mobile device resides.

Different routing areas may support different numbers of PDP contexts. However, the mobile device is unaware of how many PDP contexts a given routing area supports for the mobile device. This can lead to undesirable situations. For instance, the mobile device might request a new PDP context to be established while unaware that a maximum number of IP sessions is already established. Therefore, the mobile device will be unsuccessful in establishing the new PDP context. This leads to poor management of PDP contexts by the mobile device. If more services using a PDP context are requested the by user than are supported by network then there may be some sort of multiplexing of which some services are delayed, etc.

A possible approach is for the mobile device to always assume that only one PDP context is supported. However, this approach does not take advantage of when additional PDP contexts are supported. This may result in unhappy users on networks that supported more than one PDP context.

BRIEF DESCRIPTION OF THE DRAWINGS

Embodiments will now be described with reference to the attached drawings in which:

FIGS. 4A and 4B are tables of example message contents of messages that can be used to transmit the identification of how many IP sessions can be supported;

FIGS. 5A and 5B are tables of an example PDP contexts supported information element; and FIGS. 6 through 8 are flowcharts of an example method of managing IP sessions based on the identification of how many IP sessions can be supported.

DETAILED DESCRIPTION OF EMBODIMENTS

According to a broad aspect, there is provided method in a wireless network comprising: determining how many IP sessions can be supported for a mobile device residing in a given area; and transmitting to the mobile device an identification of how many IP sessions can be supported.

According to another broad aspect, there is provided a computer readable medium having computer executable instructions stored thereon for execution on a processor so as to implement the method summarised above.

According to another broad aspect, there is provided a wireless network comprising an IP session function adapted to determine how many IP sessions can be supported for a mobile device residing in a given area; and transmit to the mobile device an identification of how many IP sessions can be supported.

According to another broad aspect, there is provided a method in a mobile device comprising: receiving from a wireless network an identification of how many IP sessions the wireless network is capable of supporting for the mobile device; and managing IP sessions based on the identification.

According to another broad aspect, there is provided a computer readable medium having computer executable instructions stored thereon for execution on a processor so as to implement the method summarised above.

According to another broad aspect, there is provided a mobile device comprising: a wireless access radio adapted to communicate with a wireless network; and an IP session management function adapted to: receive an identification of how many IP sessions the wireless network is capable of supporting; and manage IP sessions based on the identification.

Wireless Communication System

Figure 1A:
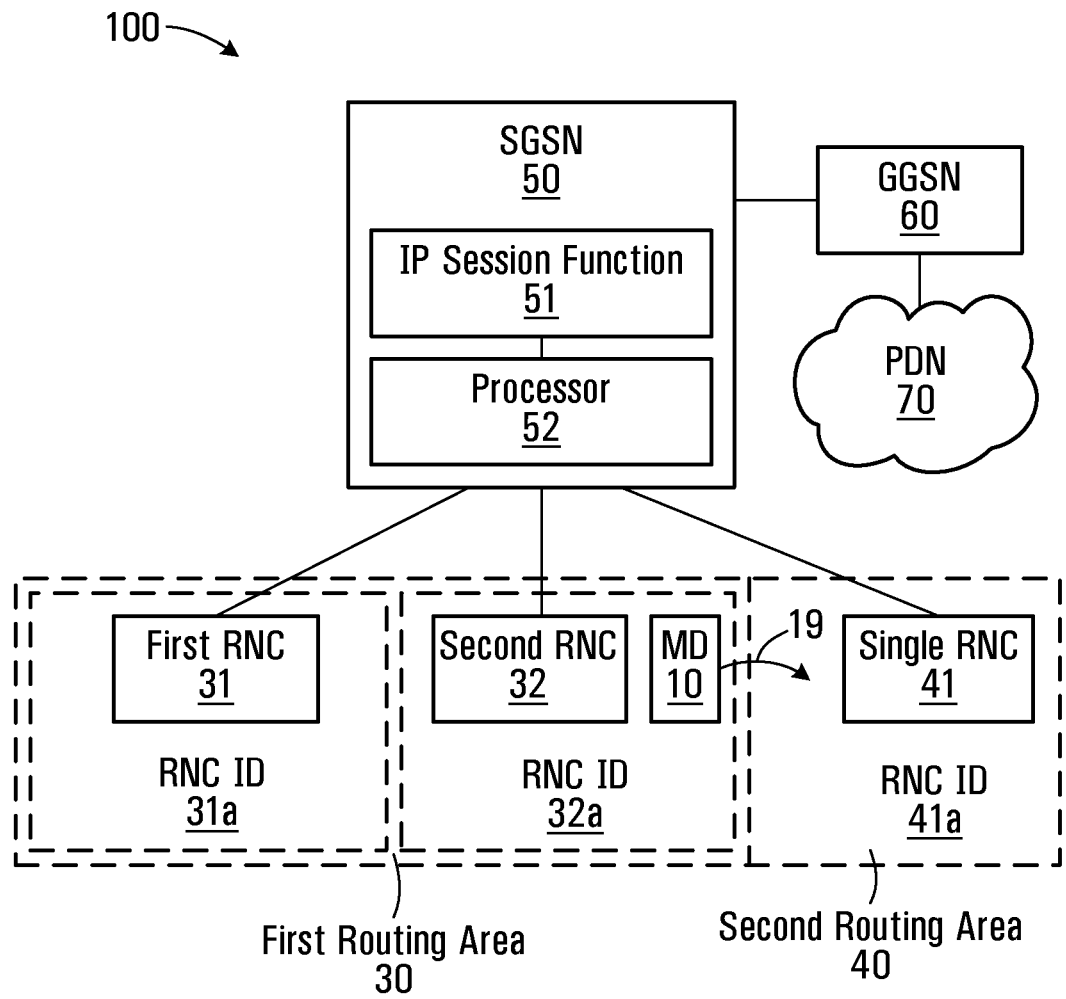
FIG. 1A is a block diagram of an example wireless network and a mobile device.

Referring now to FIG. 1A, shown is a block diagram of an example wireless network 100 and a mobile device 100. The wireless network 100 has a first routing area 30 and a second routing area 40. There may be other routing areas, but they are not shown for simplicity. Each routing area has at least one RNC (Radio Network Controller). In the illustrated example, the first routing area 30 has a first RNC 31 and a second RNC 32 while the second routing area 40 has a single RNC 41. Each RNC 31,32,41 is associated with a respective RNC Id. The first RNC 31 and the second RNC 32 of the first routing area 30 have an RNC Id 31a and an RNC Id 32a, respectively, while the single RNC 41 of the second routing area 40 has an RNC Id 41a. Each cell (not shown) within an RNC (via a Node B) is associated with an RAI (Routing Area Identification) in a hierarchal fashion. An RAI may include one or more cells and span across RNCs. In some implementations, each RAI is a combination of a country code, a network code, and a routing area code. RAIs may differ for other wireless networks.

In the illustrated example, each RNC 31,32,41 is coupled to an SGSN (Serving General Packet Radio Service Support Node) 50, which in turn is coupled to a GGSN (Gateway GPRS Support Node) 60, which in turn is coupled to a PDN (Packet Data Network) 70. The PDN 70 may for example be an Internet. The SGSN 50 has an IP session function 51 coupled to a processor 52 and may have other components, but they are not shown for simplicity.

Figure 1B:
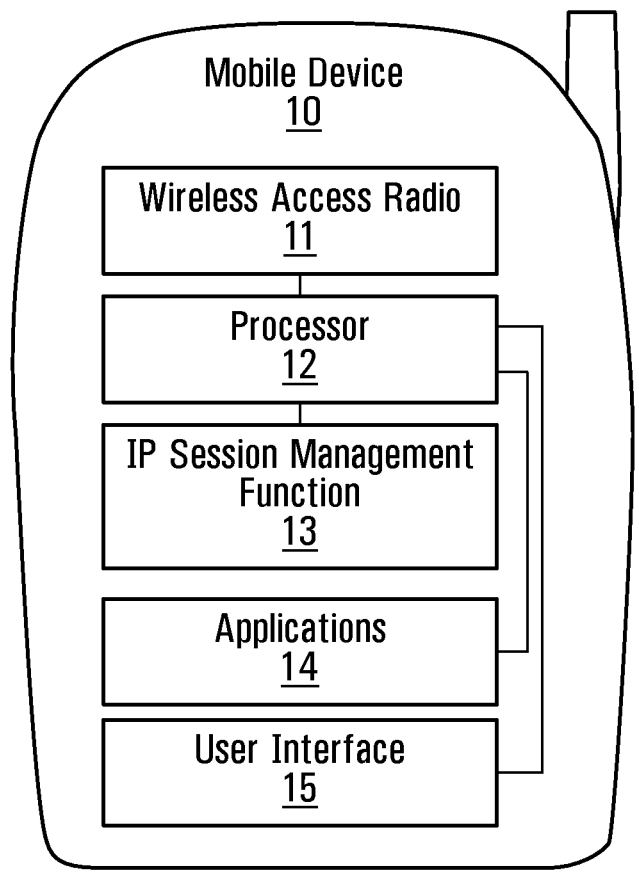
FIG. 1B is a block diagram of the mobile device shown in FIG. 1A.

The wireless network 100 is shown with a single mobile device, namely the mobile device 10. There may be other mobile devices, but they are not shown for simplicity. With reference to FIG. 1B, shown is a block diagram of the mobile device 10 shown in FIG. 1A. The mobile device 10 has a processor 12, which is coupled to a wireless access radio 11, an IP session management function 13, applications 14, and a user interface 15. The mobile device 10 may have other components, but they are not shown for sake of simplicity. With reference back to FIG. 1A, the mobile device 10 is currently positioned within the first routing area 31. However, the mobile device 10 may move to another routing area such as the second routing area 40 as indicated by a moving arrow 19.

In operation, the mobile device 10 is adapted to communicate with the wireless network 100 using its wireless access radio 11. Such communication may for example be voice communication, electronic messaging, or any other appropriate form of communication supported by the applications 14. At least some communication with the wireless network 100 is over one or more IP sessions between the mobile device 10 and the SGSN 50. A PDP (Packet Data Protocol) session is an example of an IP session. There may be many IP sessions between the mobile device 10 and the SGSN 50 depending on how many of the applications 14 have an established IP session. However, the number of IP sessions is typically limited by the routing area in which the mobile device 10 resides, which is currently the first routing area 30.

According to an embodiment of the application, the IP session function 51 implements a method in the SGSN 50 so as to determine how many IP sessions can be supported for the mobile device 10 residing in a given routing area, which is the first routing area 30 in this example, and to transmit to the mobile device 10 an identification of how many IP sessions can be supported. According to another embodiment of the application, the IP session management function 13 implements a method in the mobile device 10 so as to receive the identification of how many IP sessions can be established and to manage IP sessions based on the identification. Further details are provided below with reference to FIGS. 2 through 7.

In the illustrated example, it is assumed that within each routing area the same number of IP sessions is supported for the mobile device 10 regardless of how many RNCs are present. Typically a routing area has a single RNC, such is the case with the second routing area 40. The number of IP sessions supported for a given mobile device is currently limited by the RNC. Therefore, while the limiting factor is actually the RNC, the routing area can typically be regarded as the limiting factor. However, a routing area might have more than one RNC, such is the case with the first routing area 30. Therefore, it is possible for a routing area to support a different number of PDP contexts for a mobile device depending on where in the routing area the mobile device resides. This is the case in which the routing area cannot be regarded as the limiting factor. While the examples presented herein refer to "routing areas" as limiting the number of IP sessions for a mobile device, it is to be understood that more generally an "area" limits the number of IP sessions for the mobile device. The "area" may be a routing area, a portion of a routing area as defined for example by an RNC Id, a network, a cell id, or any other area in which the number of IP sessions supported for a mobile device is limited.

In some implementations, there are subtleties between the Connected/Active state (CELL_DCH, CELL_FACH) and the Idle state (CELL_PCH, URA_PCH, IDLE) for the mobile device. The routing area is known to the mobile device while in the Idle state; however, the RNC id is typically not known. While in the Idle state, a mobile device moves to the Connected/Active state in order to find out its serving RNC id.

This may waste battery life, etc. Therefore, in some implementations, the number of IP sessions supported is considered for a routing area irrespective of whether this is the lowest level of granularity.

There are many possibilities for the IP session management function 13 of the mobile device 10. In the illustrated example, the IP session management function 13 is implemented as software and is executed on the processor 12. However, more generally, the IP session management function 13 may be implemented as software, hardware, firmware, or any appropriate combination thereof. In the illustrated example, the IP session management function 13 is shown as a single component. However, more generally, the IP session management function 13 may be implemented as one or more components. An example in which the IP session management function 13 includes more than one component is described below.

In some implementations, the IP session management function 13 includes a NAS (Non Access Stratum) and an AS (Access Stratum). The NAS includes a session management layer and manages IP sessions. The NAS may for example initiate an Activate PDP context request message to be sent to the SGSN 50. The AS manages an air interface of the wireless access radio 11 and includes a respective RAB (Radio Access Bearer) for each active IP session. An RAB is an identifier for an RF (Radio Frequency) pipe. There may be dormant IP sessions without respective RABs. The AS may for example initiate a service request message to be sent to the RNC.

There are many possibilities for the IP session function 51 of the wireless network 100. In the illustrated example, the IP session function 51 is implemented as software and is executed on the processor 52. However, more generally, the IP session function 51 may be implemented as software, hardware, firmware, or any appropriate combination thereof. In the illustrated example, the IP session function 51 is shown as a single component of the SGSN 50. However, more generally, the IP session function 51 may be implemented as one or more components and may be implemented as part of, or separate from, the SGSN 50. The one or more components may be distributed throughout the wireless network 100, or reside in a common location. Other implementations are possible.

There are many possibilities for the wireless network 100. In the illustrated example, the wireless network 100 is a UMTS (Universal Mobile Telecommunications System) network. However, more generally, the wireless network 100 may be any wireless network in which routing areas restrict how many IP sessions can be established for a given mobile device.

Figure 1C:
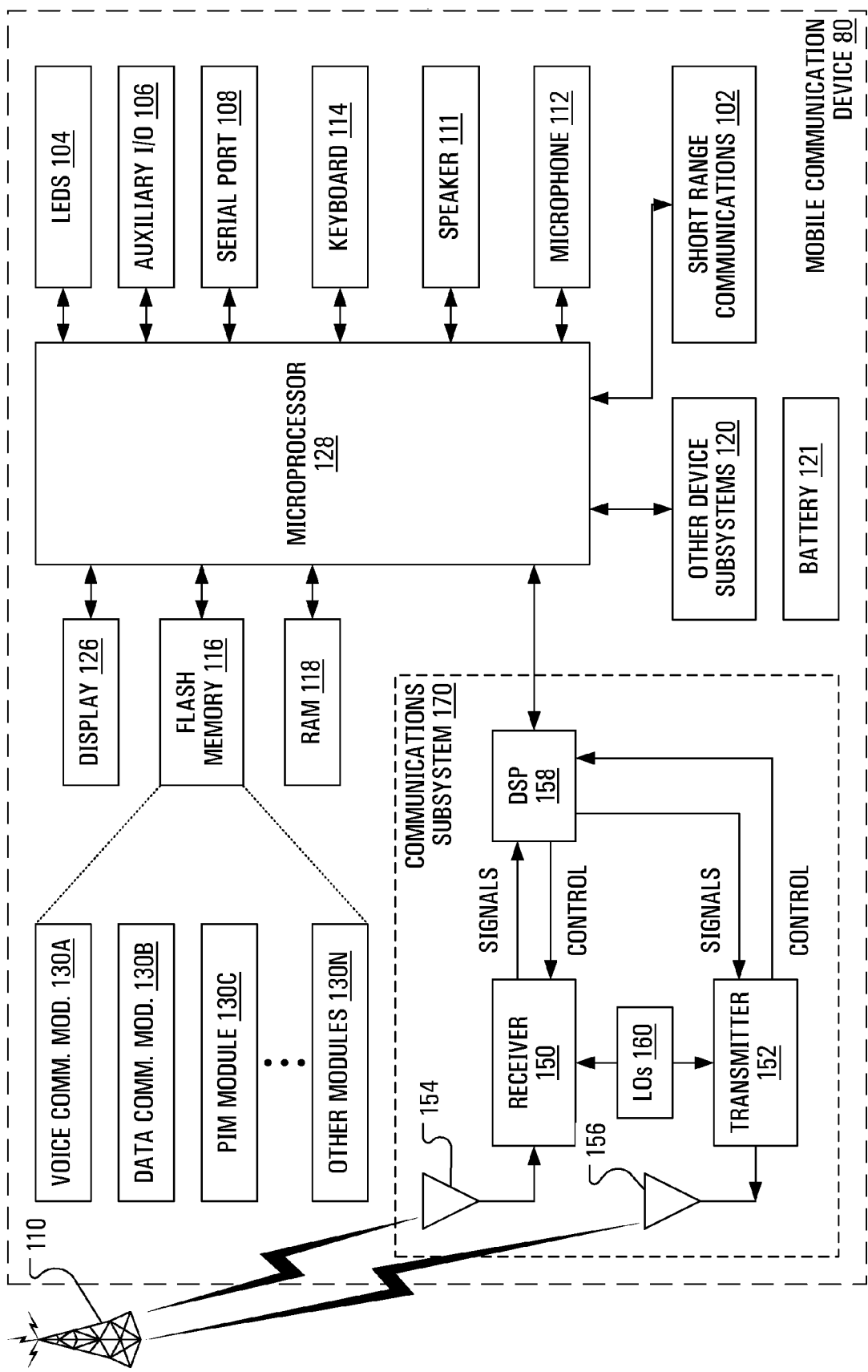
FIG. 1C is a block diagram of another mobile device.

There are many possibilities for the mobile device 10. Referring now to FIG. 1C, shown is a block diagram of another mobile device 80 that may implement any of the methods described herein. It is to be understood that the mobile device 80 is shown with very specific details for example purposes only.

A processing device (a microprocessor 128) is shown schematically as coupled between a keyboard 114 and a display 126. The microprocessor 128 controls operation of the display 126, as well as overall operation of the mobile device 80, in response to actuation of keys on the keyboard 114 by a user.

The mobile device 80 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile device 80 are shown schematically. These include: a communications subsystem 170; a short-range communications subsystem 102; the keyboard 114 and the display 126, along with other input/output devices including a set of LEDS 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 80 may have a battery 121 to power the active elements of the mobile device 80. The mobile device 80 is in some embodiments a two-way radio frequency (RF) communication device having voice and data communication capabilities. In addition, the mobile device 80 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 80 may also be stored to the RAM 118.

The microprocessor 128, in addition to its operating system functions, enables execution of software applications on the mobile device 80. A predetermined set of software applications that control basic device operations, such as a voice communications module 130A and a data communications module 130B, may be installed on the mobile device 80 during manufacture. In addition, a personal information manager (PIM) application module 130C may also be installed on the mobile device 80 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 170. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The specific design and implementation of the communication subsystem 170 is dependent upon the communication network in which the mobile device 80 is intended to operate. For example, the communication subsystem 170 of the mobile device 80 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the mobile device 80.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 80 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 80. In addition, the display 126 may also be utilized in voice communication mode, for example, to display the identity of a calling party, the duration of a voice call, or other voice call related information.

The short-range communications subsystem 102 enables communication between the mobile device 80 and other proximate systems or devices, which need not necessarily be similar devices. For example, the short-range communications subsystem may include an infrared device and associated circuits and components, or a Bluetooth™ communication module to provide for communication with similarly-enabled systems and devices.

Method in a Wireless Network

Figure 2:
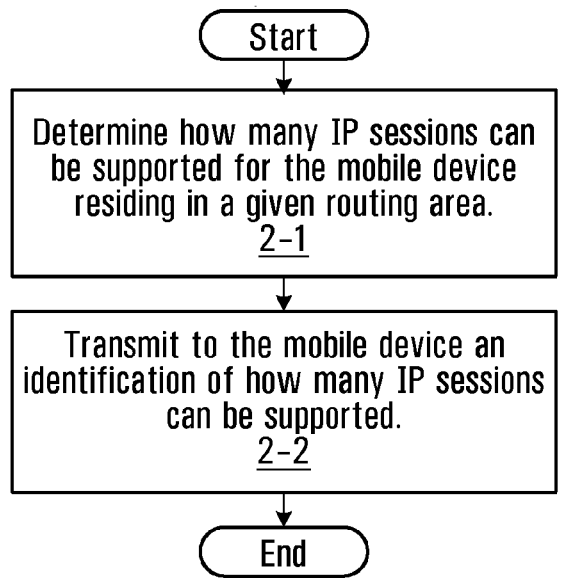
FIGS. 2 and 3 are flowcharts of an example method of transmitting to a mobile device an identification of how many IP sessions can be supported for the mobile device residing in a given routing area.
Figures 3A, 3B, 3C, 3D:
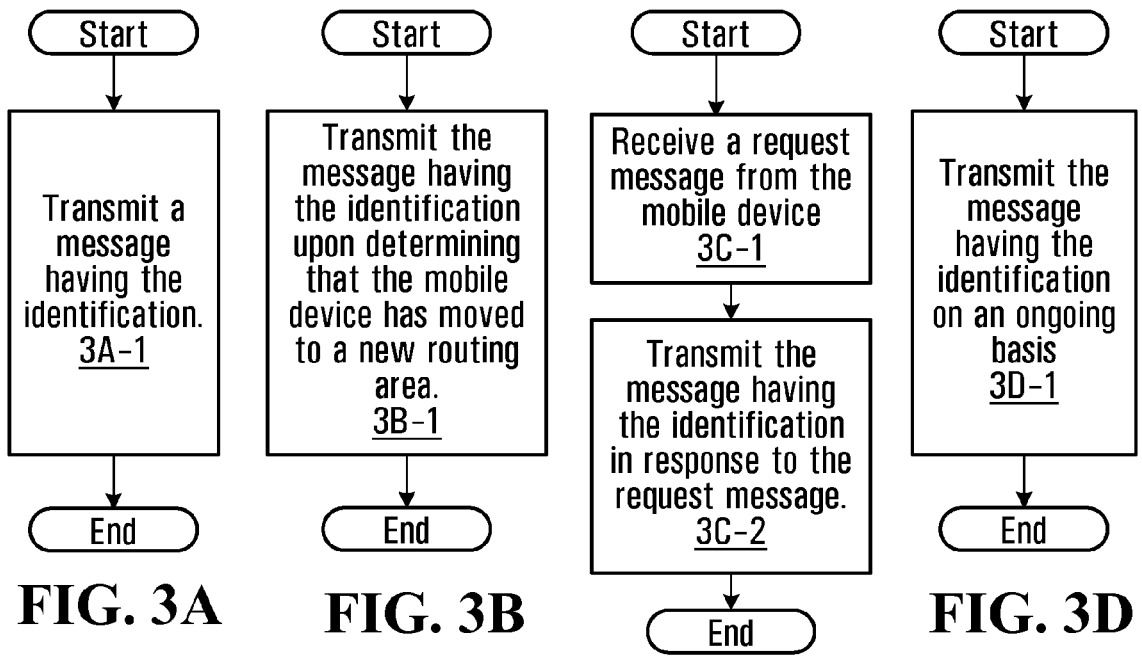

Referring now to FIG. 2, shown is a flowchart of an example method of transmitting to a mobile device an identification of how many IP sessions can be supported for the mobile device residing in a given routing area. This method may be implemented in a wireless network, for example by the IP session function 51 of the wireless network 100 shown in FIG. 1A.

At step 2-1, the wireless network determines how many IP sessions can be supported for the mobile device residing in a given routing area. At step 2-2, the wireless network transmits to the mobile device an identification of how many IP sessions can be supported for the mobile device. This allows the mobile device to become privy to how many IP sessions are supported for the mobile device in its routing area so that the mobile device may manage IP sessions accordingly.

There are many ways that the wireless network may transmit to the mobile device the identification of how many IP sessions can be supported. Examples are provided with reference to FIGS. 3A through 3D.

In some implementations, as indicated by step 3A-1, the wireless network transmits a message having the identification. There are many possible scenarios in which the wireless network may transmit the message having the identification. As noted above, different routing areas may support different numbers of IP sessions for a given mobile device. In some implementations, as indicated by step 3B-1, the wireless network transmits the message having the identification upon determining that the mobile device has moved to a new routing area. This provides a dynamic update for the mobile device so that changes in the number of IP sessions supported by the wireless network due to movement among routing areas are detected. In some implementations, the wireless network receives a request message from the mobile device at step 3C-1 and transmits the message having the identification in response to the request message at step 3C-2. This allows the mobile device to request the wireless network to transmit the message having the identification. In other implementations, as indicated by step 3D-1, the wireless network transmits the message having the identification on an ongoing basis. Other implementations are possible.

There are many possibilities for the message having the identification of how many IP sessions can be supported for the mobile device residing in a given routing area. The type of the message may depend on the scenario in which the message is transmitted by the wireless network and received by the mobile device. For example, some messages are transmitted by the wireless network in response to a request message from the mobile device while others are not. Specific messages are indicated below for example purposes. It is to be understood that specific details of the example messages are provided for example purposes only.

In some implementations, the message is an Attach Accept message, which is transmitted in response to receiving an Attach Request message from the mobile device. This message may be sent by the wireless network to the mobile device to indicate that the corresponding attach request has been accepted. The Attach Request message may be transmitted by the mobile device for example whenever the mobile device is powered in. In some implementations, the Attach Accept message is provided with the identification of how many IP sessions are supported as a new field. Referring to FIG. 4A, shown is a table of example message content of the Attach Accept message. The table has columns labeled as IEI 81, Information Element 82, Type 83, Presence 84, Format 85, and length 86. The table has a plurality of fields 91 including a "PDP context supported" field, which is the new field to convey how many IP sessions are supported. The "PDP context supported" field has an IEI value, which may for example be 39.

In other implementations, the message is an RAU (Routing Area Update) accept message, which is transmitted in response to receiving an RAU request message from the mobile device. This message may be sent by the wireless network to the mobile device to provide the mobile device with GPRS mobility management related data in response to a routing area update request message. In some implementations, the RAU accept message is provided with the identification of how many IP sessions are supported as a new field. Referring to FIG. 4B, shown is a table of example message content of the RAU accept message. The table has columns labeled as IEI 81, Information Element 82, Type 83, Presence 84, Format 85, and length 86. The table has a plurality of fields 98 including a "PDP context supported" field, which is the new field to convey how many IP sessions are supported. The "PDP context supported" field has an IEI value, which may for example be 39.

In other implementations, the identification is included as part of a System Information message, which is broadcasted at a predefined frequency on an ongoing basis. More generally, the identification may be included as part of any message that is transmitted on an ongoing basis.

In other implementations, the message is an Activate PDP context reject message or an Activate PDP context accept message, one of which is transmitted in response to an Activate PDP context Request message received from the mobile device.

In other implementations, the message is a Service Reject message or a Service Accept message, one of which is transmitted in response to a Service Request message received from the mobile device.

In other implementations, the message is an Activate Secondary PDP Context Accept message.

In other implementations, the message is a Modify PDP context accept message.

In other implementations, the message is a Modify PDP context request message sent from the wireless network to the mobile device.

In other implementations, the message is an IP Session Support message. The IP Session Support message is any appropriate message that can convey the identification of how many IP sessions the wireless network is capable of supporting for the mobile device.

In some implementations, the wireless network transmits combinations of messages of varying kinds. Other implementations are possible.

Example messages have been provided above for the message having the identification of how many IP sessions can be supported. In some implementations, the messages are based on messages defined in 3GPP (3rd Generation Partnership Project) TS 24.008 V7.5.0 with appropriate modification for including the identification of how many IP sessions can be supported. Other implementations are possible.

There are many possibilities for the identification. Referring now to FIGS. 5A and 5B, shown are tables of an example PDP contexts supported information element. It is to be understood that the PDP contexts supported information element shown in the illustrated example is a specific implementation for the indication for example purposes only. The purpose of the PDP Contexts Supported information element is to specify the number of PDP contexts supported by the wireless network. The PDP Contexts Supported is a type 3 information element with 2 octets length. The PDP Contexts Supported information element is coded according to a coding scheme. In some implementations, the coding scheme includes the numeric number of PDPs. In some implementations, the number of PDPs is preceded by the IEI (information element identifier) for the data field. The table of FIG. 5A has a "PDP contexts supported value" entry. As indicated in the table of FIG. 5B, the entry represents the binary coded value of the number of PDP contexts supported.

In the examples presented above, the network provides the identification of how many IP sessions can be supported for the mobile device residing in a given routing area. In another implementation, the network provides an identification of how many IP sessions can be supported for the mobile device for each of a plurality of areas. In specific implementations, the wireless network provides an identification of how many IP sessions can be supported for the mobile device for each and every area of the wireless network. This allows the mobile device to become privy to how many IP sessions other areas support in addition to how many IP sessions the area in which the mobile device resides supports. In some implementations, the information is stored locally on the mobile device in a permanent manner so as to avoid having to receive the information again. In other implementations, the information is stored locally on the mobile device in a temporary manner. Other implementations are possible.

Method in a Mobile Device

Referring now to FIG. 6, shown is a flowchart of an example method of managing IP sessions based on an identification of how many IP sessions can be supported. This method may be implemented in a mobile device, for example by the IP session priority management function 13 of the mobile device 10 shown in FIG. 1B, or by the mobile device 80 shown in FIG. 1C.

As indicated above, the wireless network transmits an identification of how many IP sessions the wireless network is capable of supporting for the mobile device. At step 6-1, the mobile device receives from the wireless network the identification of how many IP sessions the wireless network is capable of supporting for the mobile device. The mobile device may for example receive the identification in any appropriate manner corresponding with any of the implementations provided above for transmitting the identification. By receiving the identification, the mobile device becomes privy to how many IP sessions are supported for the mobile device in its routing area. At step 6-2, the mobile device manages IP sessions based on the identification.

There are many ways for the mobile device to receive the identification of how many IP sessions the wireless network is capable of supporting for the mobile device. The mobile device may for example receive the identification as it is transmitted by the wireless network using any one or more of the implementations described above.

There are many ways that the mobile device may manage IP sessions based on the identification. Examples are provided below with reference to FIGS. 7 and 8. It is to be understood that these examples are specific and are intended to be for example purposes only. Other implementations are possible.

Figure 7:
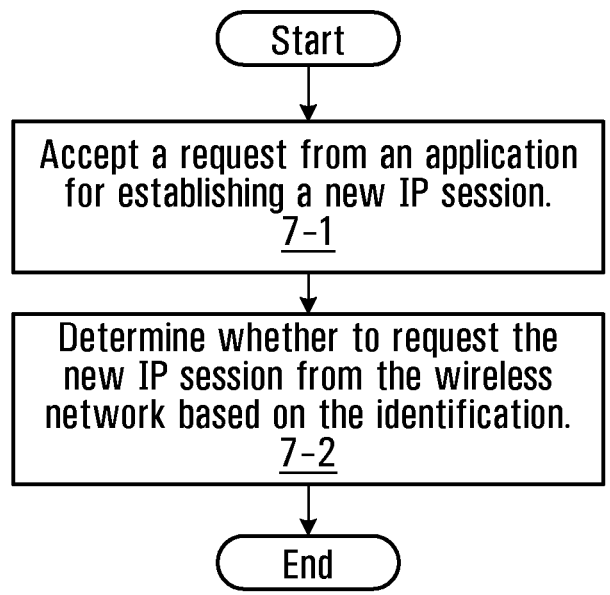

Referring first to FIG. 7, at step 7-1 the mobile device accepts a request from an application for establishing a new IP session. The application may be any application running on the mobile device that is adapted to communicate over an IP session. At step 7-2, the mobile device determines whether to request the new IP session from the wireless network based on the identification. The mobile device may for example request the new IP session only if the number of IP sessions that are established is less than the number IP sessions that the wireless network is capable of supporting for the mobile device.

Figure 8:
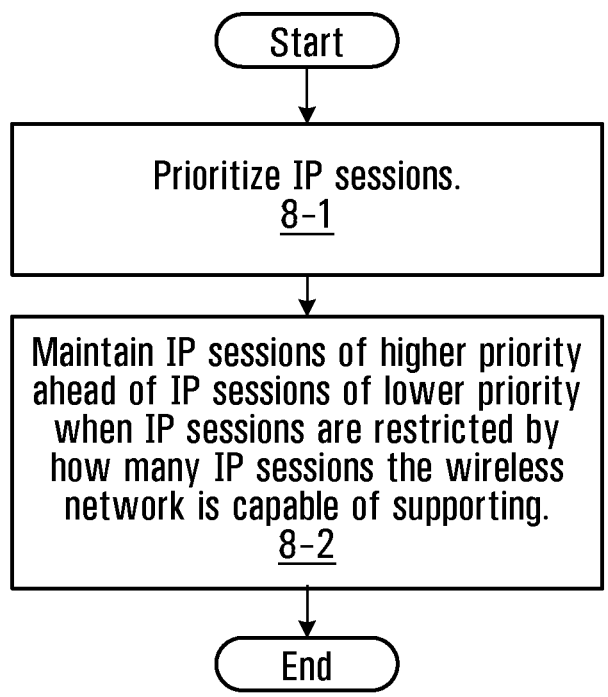

Referring next to FIG. 8, at step 8-1 the mobile device prioritizes IP sessions. At step 8-2, the mobile device maintains IP sessions of higher priority ahead of IP sessions of lower priority when IP sessions are restricted by how many IP sessions the wireless network is capable of supporting. The mobile device is aware of whether IP sessions are restricted based on the identification.

It is to be understood that an IP session is indicated to be of "higher" priority when its priority is generally indicated as being higher than other IP sessions. In some implementations, this is the IP session with the highest priority. An IP session indicated as having a higher priority may not be a high priority IP session per se, but is nonetheless indicated as having a higher priority than other IP sessions.

There are many ways that the mobile device may prioritizes IP sessions. In some implementations, the mobile device accepts user input for determining a respective priority for each IP session. Accordingly, the mobile device determines the respective priority for each IP session based on the user input. In other implementations, the mobile device maintains a record of a predefined priority level for each IP session of a predefined type. Accordingly, the mobile device determines the respective priority for each IP session based on the record. Other implementations are possible.

IP Sessions

In the examples presented above, references are made to IP sessions. It is to be understood that there are many possibilities for the IP sessions. The IP sessions may for example include any of an Always-On IP session, an IM (Instant Messaging) IP session, a WAP (Wireless Application Protocol) IP session, an MMS (Multimedia Messaging Service) IP session, a DUN (Dial-Up Networking) IP session, an LBS (Location Base Services) IP session, IP Modem IP session, and a PTT (Push-to-Talk) IP session. The nature of the IP sessions is implementation specific and typically depends on the wireless network. In some implementations, the wireless network is a UMTS network and each IP session is part of a respective PDP (Packet Data Protocol) context.

Numerous modifications and variations of the present application are possible in light of the above teachings. It is therefore to be understood that within the scope of the appended claims, the application may be practised otherwise than as specifically described herein.

We claim:

1. A method in a wireless network comprising:
determining how many IP sessions can be supported for a mobile device residing in a given area; and
transmitting to the mobile device an identification of how many IP sessions can be supported in the given area;
determining how many IP sessions can be supported for a mobile device for each of a plurality of areas; and
transmitting to the mobile device an identification of how many IP sessions can be supported for each of the plurality of areas;
wherein the identifications are stored locally on the mobile device thereby allowing the mobile device to manage IP sessions based on the identifications.

2. The method of claim 1 wherein the area is one of a routing area and an area defined by an RNC Id.

3. The method of claim 1 wherein transmitting to the mobile device the identification of how many IP sessions can be supported comprises:
transmitting a message comprising the identification.

4. The method of claim 3 wherein transmitting the message comprising the identification comprises:
transmitting the message comprising the identification upon determining that the mobile device has moved to a new area.

5. The method of claim 3 further comprising:
receiving a request message;
wherein transmitting the message comprising the identification is in response to the request message.

6. The method of claim 3 wherein transmitting the message comprising the identification comprises:
transmitting the message comprising the identification on an ongoing basis.

7. The method of claim 3 wherein the message comprises one of an Attach Accept message, an RAU (Routing Area Update) Accept message, a System Information message, an Activate PDP context Reject message, an Activate PDP context Accept message, a Service Reject message, a Service Accept message, an Activate Secondary PDP Context Accept message, a Modify PDP context accept message, a Modify PDP context request message, and an IP Session Support message.

8. The method of claim 1 wherein each IP session is part of a respective PDP context.

9. A non-transitory computer readable medium having computer executable instructions stored thereon for execution on a processor so as to implement the method of claim 1.

10. A wireless network comprising:
an IP session function configured to:
determine how many IP sessions can be supported for a mobile device residing in a given area; and
transmit to the mobile device an identification of how many IP sessions can be supported in the given area;
determine how many IP sessions can be supported for a mobile device for each of a plurality of areas; and
transmit to the mobile device an identification of how many IP sessions can be supported for each of the plurality of areas;
wherein the identifications are stored locally on the mobile device thereby allowing the mobile device to manage IP sessions based on the identifications.

11. A method in a mobile device comprising:
receiving from a wireless network an identification of how many IP sessions the wireless network is capable of supporting for the mobile device residing in a given area;
receiving from the wireless network an identification of how many IP sessions the wireless network is capable of supporting for each of a plurality of areas; and
managing IP sessions based on the identifications;
wherein the identifications are stored locally on the mobile device.

12. The method of claim 11 wherein the area is one of a routing area and an area defined by an RNC Id.

13. The method of claim 11 wherein receiving from the wireless network the identification of how many IP sessions the wireless network is capable of supporting comprises:
receiving a message comprising the identification.

14. The method of claim 13 wherein receiving the message comprising the identification comprises:
receiving the message comprising the identification upon moving to a new area.

15. The method of claim 13 further comprising:
transmitting a request message;
wherein receiving the message comprising the identification is in response to the request message.

16. The method of claim 13 wherein receiving the message comprising the identification comprises:
receiving the message comprising the identification on an ongoing basis.

17. The method of claim 13 wherein the message is one of an Attach Accept message, an RAU (Routing Area Update) Accept message, a System Information message, an Activate PDP context Reject message, an Activate PDP context Accept message, a Service Reject message, a Service Accept message, an Activate Secondary PDP Context Accept message, a Modify PDP context accept message, a Modify PDP context request message, and an IP Session Support message.

18. The method of claim 11 further comprising:
accepting a request from an application for establishing a new IP session;
wherein managing IP sessions based on the identifications comprises determining whether to request the new IP session from the wireless network based on the identification.

19. The method of claim 11 further comprising:
prioritising IP sessions;
wherein managing IP sessions based on the identifications comprises maintaining IP sessions of higher priority ahead of IP sessions of lower priority when IP sessions are restricted by how many IP sessions the wireless network is capable of supporting.

20. The method of claim 11 wherein each IP session is part of a respective PDP context.

21. A non-transitory computer readable medium having computer executable instructions stored thereon for execution on a processor so as to implement the method of claim 11.

22. A mobile device comprising:
a wireless access radio configured to communicate with a wireless network; and
an IP session management function configured to:
receive from the wireless network an identification of how many IP sessions the wireless network is capable of supporting for the mobile device residing in a given area;
receive from the wireless network an identification of how many IP sessions the wireless network is capable of supporting for each of a plurality of areas; and
manage IP sessions based on the identifications;
wherein the identifications are stored locally on the mobile device.

23. A mobile device comprising:
a wireless access radio configured to communicate with a wireless network; and
an IP session management function configured to:
receive from the wireless network an identification of how many IP sessions per mobile device the wireless network is capable of supporting in each of a plurality of areas including an area in which the mobile device resides and at least one other area; and
manage IP sessions based on the identification of how many IP sessions per mobile device the wireless network is capable of supporting for the mobile device in each of the plurality of areas;
wherein the identification is stored locally on the mobile device.

* * * * *